US005500678A

United States Patent [19]
Puri

[11] Patent Number: 5,500,678
[45] Date of Patent: Mar. 19, 1996

[54] OPTIMIZED SCANNING OF TRANSFORM COEFFICIENTS IN VIDEO CODING

[75] Inventor: Atul Puri, Riverdale, N.Y.

[73] Assignee: AT&T Corp., Murray Hill, N.J.

[21] Appl. No.: 215,532

[22] Filed: Mar. 18, 1994

[51] Int. Cl.[6] .................................................. H04N 7/50
[52] U.S. Cl. ........................................ 348/408; 348/405
[58] Field of Search ................................. 348/408, 405, 348/419; H04N 7/133, 7/50

[56] References Cited

U.S. PATENT DOCUMENTS 5,227,878  7/1993  Puri ............................................ 348/416

Primary Examiner—Howard W. Britton
Attorney, Agent, or Firm—Eugene S. Indyk; Mark K. Young

[57] ABSTRACT

An improved scanning apparatus and method which allows for increased coding efficiency over conventional zigzag scans is disclosed. The invention advantageously allows for total compatibility with the MPEG-1 standard, and accomodates video sequences which may be composed of both the progressive and interlaced format frames.

19 Claims, 7 Drawing Sheets

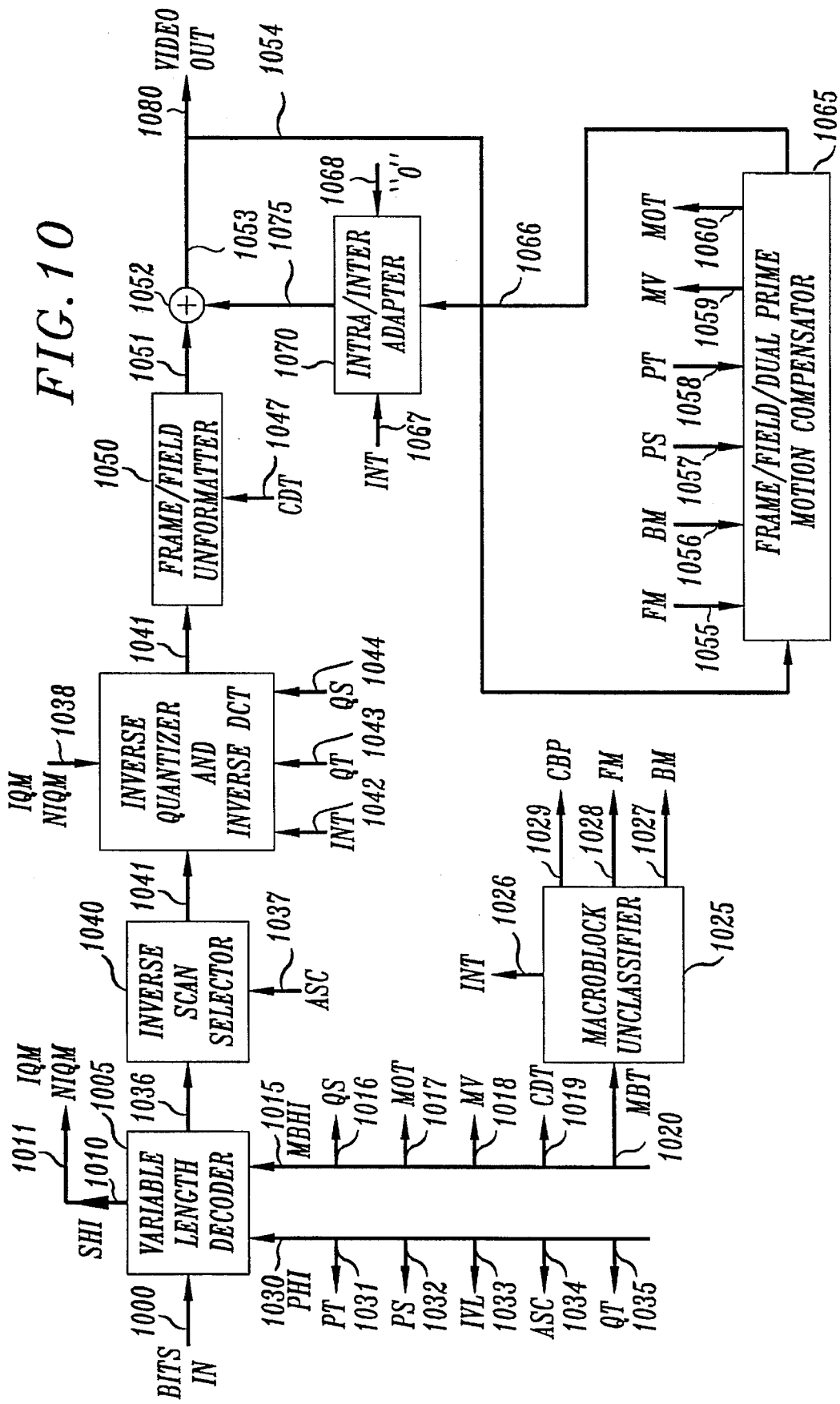

OPTIMIZED SCANNING OF TRANSFORM COEFFICIENTS IN VIDEO CODING

TECHNICAL FIELD

This invention relates to coding of video signals. More particularly, this invention relates to optimized scanning of transform coefficients for improved coding efficiency.

BACKGROUND

Transform coding is an efficient image compression scheme that typically involves segmenting an image into blocks of pixels, taking discrete cosine transforms ("DCTs") of the blocks of pixels to obtain blocks of DCT coefficients, quantizing these coefficients, and coding the quantized coefficients by an entropy coder. Interframe coding schemes utilizing motion compensation and transform coding of motion compensated interframe differences, by taking DCTs of blocks of difference pixels, quantizing the DCT coefficients and entropy coding the quantized DCT coefficients, may also be employed.

Interframe coding employing motion compensation and DCT coding has become widely recognized as a particularly efficient coding scheme for video compression and forms the core of the Comité Consulatif International Télégraphique et Téléphonique Recommendation H.261-Video Codec for Audiovisual Services at 64 Kbit/s, Geneva, August, 1990 ("CCITT H.261") and the Motion Pictures Expert Group Phase 1 ("MPEG-1") video compression standards. The MPEG-1 standard is set forth in International Standards Organization ("ISO") Committee Draft 11172-2, "Coding of Moving Pictures and Associated Audio for Digital Storage Media at up to 1.5 Mbits/s," November, 1991. The CCITT H.261 standard primarily addresses coding of video conferencing scenes of Common Intermediate Format resolution at bitrates of 64 kbit/s to 2 Mbit/s; the MPEG-1 standard can be efficiently used for coding all types of video scenes in 1 to 2 Mbit/s range. The MPEG-1 standard incorporates additional features, for example, group-of-pictures and motion compensated bidirectional prediction. However, because the MPEG-1 standard was initially applied to progressive format video, it is not optimized for coding of interlaced video conforming to the Comité Consulatif International des Radiocommunications Recommendation 601 ("CCIR 601") format which is similar to that used for broadcast and cable television. The CCITT H.261 and MPEG-1 coding standards specify that the DCT coefficients must be ordered before they are encoded. This ordering of DCT coefficients prior to encoding is called "scanning." For progressive format video, a conventional zigzag scan of DCT coefficients mentioned in the standards allows for ordering of the coefficients relative to their significance from low frequency to high frequency which results in events that can be efficiently coded by a two-dimensional variable length coder. Unfortunately, conventional zigzag scans do not allow for efficient coding of interlaced format video signals.

One approach to video coding using alternatives to the zigzag scan is discussed in U.S. Pat. No. 5,227,878 by A. Puri et al. which refers to adaptive coding on a macroblock basis using frame or field coding.

SUMMARY

Applicant has developed a novel scanning apparatus and method which allows for increased coding efficiency over conventional zigzag scans. The invention advantageously allows for total compatibility with the MPEG-1 standard, and accomodates video sequences which may be composed of both the progressive and interlaced format frames.

The discussion in this Summary and the following Brief Description of the Drawings, Detailed Description, and drawings only deals with examples of this invention and is not to be considered in any way a limitation on the scope of the exclusionary rights conferred by a patent which may issue from this application. The scope of such exclusionary rights is set forth in the claims at the end of this application.

BRIEF DESCRIPTION OF THE DRAWINGS

FIG. 10 is a simplified block diagram of an illustrative decoder employing an alternative to conventional zigzag scans and a scan adaptation in accordance with the invention.

DETAILED DESCRIPTION

Figure 1:
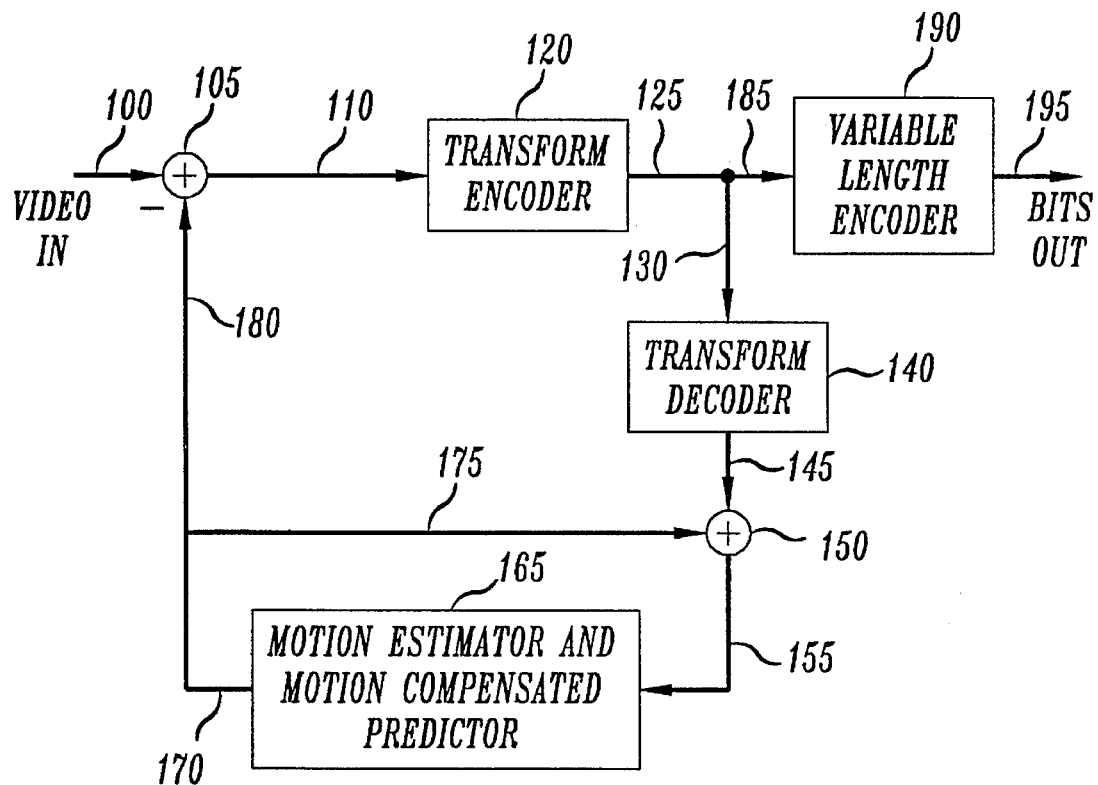
FIG. 1 is a simplified block diagram of an illustrative interframe motion compensated transform encoder.

FIG. 1 is the simplified block diagram of an illustrative generalized interframe encoder. Video frames enter one-by-one at bus 100. Subtracter 105 differences an input frame of video on bus 100 with a prediction frame available on bus 180. The resulting prediction error signal appears on bus 110 and is transform encoded by the transform encoder 120 which outputs quantized and scanned transform coefficients on bus 125 which are simultaneously available on buses 130 and 185. Variable length encoder 190 entropy encodes these coefficients and multiplexes with other encoded overhead (not shown) and outputs a stream of bits on bus 195 for transport over a transmission channel or to a storage disk for eventual delivery to a decoder. The coefficients also get fed back on bus 130 to transform decoder 140 which outputs, on bus 145, an approximation of the prediction error signal on bus 110. A prediction signal available on bus 175 is summed to an approximated prediction error signal on bus 145 in adder 150, resulting in locally reconstructed output on bus 155 which is fed to motion estimator and motion compensated predictor 165 whose output is the prediction signal at bus 170. Those skilled in the art will appreciate that operation of the motion estimator and motion compensated predictor need not be described in detail here. However, it is necessary to explicitly state that motion compensated estimator and predictor 165 may not only compute motion estimates required for forward prediction, as in the CCITT H.261 standard, but also compute motion estimates required for forward and backward predictions, as in the MPEG-1 standard. The prediction signal at bus 170 is simultaneously made available at bus 180 to one of the inputs to the subtracter 105 as well as at bus 175 to one of the inputs to the adder 150.

Figure 2:
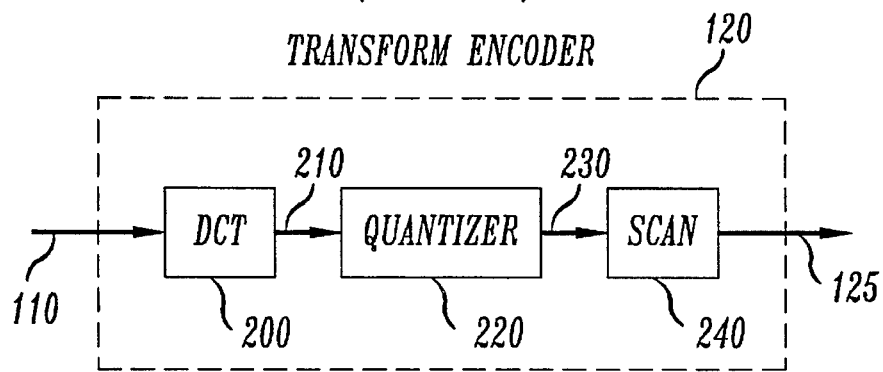
FIG. 2 is a block diagram of some details of an illustrative transform encoder.

FIG. 2 shows details of transform encoder 120 shown in FIG. 1. The input signal is segmented into two-dimensional non-overlapping blocks of pixels, typically, into 8×8 blocks which are fed to bus 110 and are transformed to corresponding 8×8 blocks of coefficients by the DCT 200. The coefficients are then sent over bus 210 to quantizer 220. The quantized DCT two-dimensional coefficient blocks on bus 230 are then scanned to a one dimensional sequence of coefficients with the property that the more important coefficients are scanned first and the runs of coefficients quantized to zero are maximized. This is accomplished by scan 240. The scanned quantized DCT coefficients are output on bus 125 and are now ready for efficient entropy coding. Depending on the signal at the input 110, this type of transform encoder can be used to encode the original input signal or the prediction error signal. The conventional technique for scanning blocks of two-dimensional quantized DCT coefficients into a one dimensional sequence of coefficients for every block is called the zigzag scan.

Figure 3:
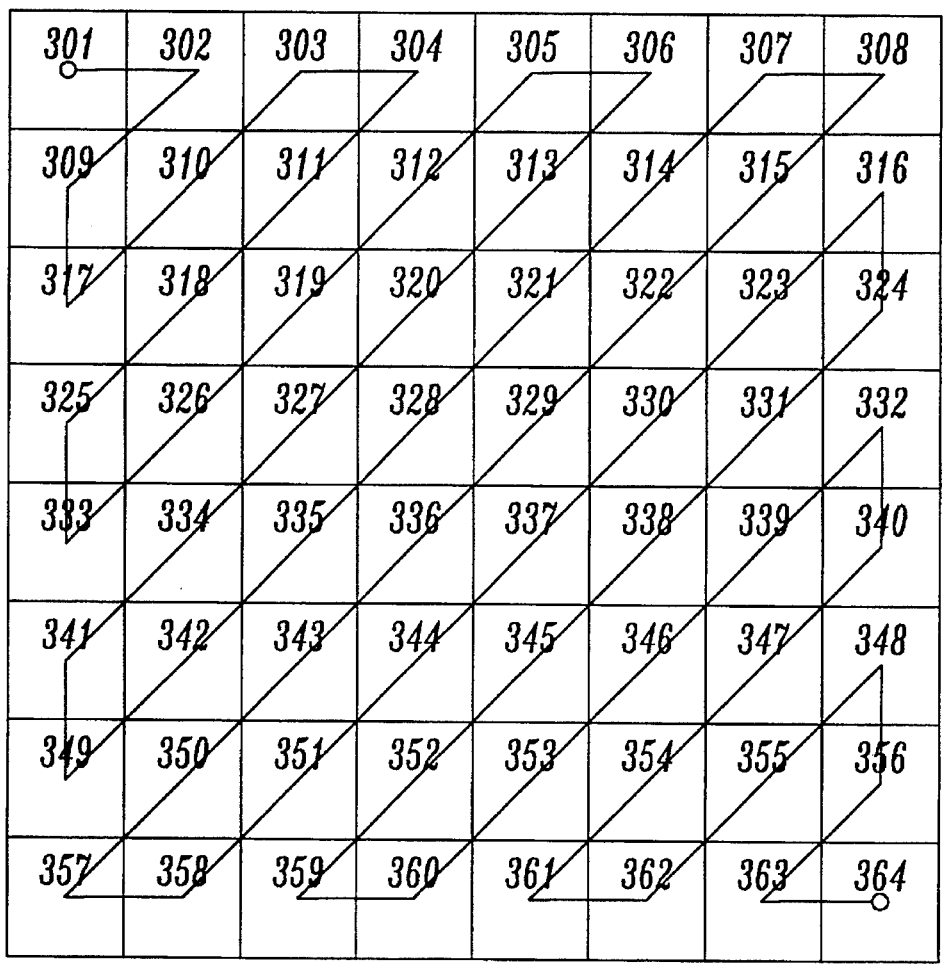
FIG. 3 shows the order in which DCT coefficients are scanned using a zigzag scan conforming to the MPEG-1 and CCITT H.261 standards.

FIG. 3 shows the order in which the quantized transform coefficients forming a two dimensional block are scanned to produce a one dimensional sequence of quantized transform coefficients when performing the zigzag scan. Starting with the DC coefficient located at 301, low frequency coefficients located at 302, 309, 317, 310, 303,304, 311, 318, 32S, 333,326, 318, 312, 305,306, 313,320, 327,334, 341 and so on along the zigzag scan path until the last coefficient located at 364 is scanned. The output of the scan on bus 125 consists of pairs of runs of zero quantized coefficients followed by the amplitude of next non- zero coefficient. These pairs are entropy encoded in a variable length encoder 190.

Figure 4:
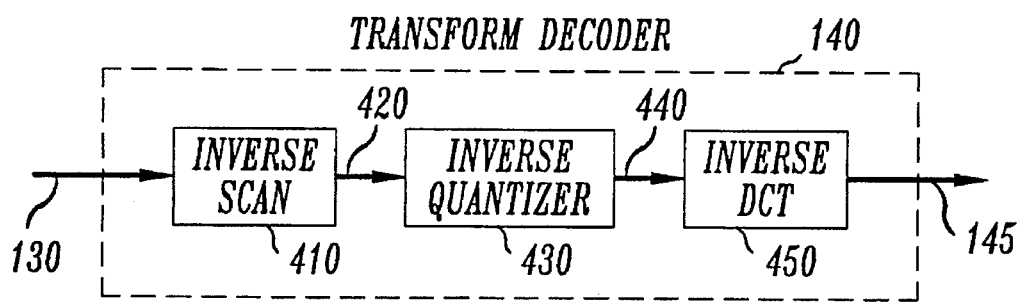
FIG. 4 is a block diagram of some details of an illustrative transform decoder.

The details of the transform decoder 140 employed in FIG. 1 are shown in FIG. 4. This decoder reverses the operations performed by the transform encoder 120. Bus 130 at the input to the transform decoder consists of pairs of runs of zero quantized coefficients followed by the amplitude of next non-zero coefficient. Inverse scan 410 restores a two-dimensional block of quantized DCT coefficients by following the sequence of run, amplitude pairs available on bus 130, representing the output of the scan 240. These two-dimensional blocks of quantized coefficients are input to inverse quantizer 430 via bus 420. The output of quantizer 440 is inverse transformed in inverse DCT 450 to produce two-dimensional blocks of pixels which are output on bus 145. Then, inverse scan 410 employs the same zigzag scan order of 300 as the forward scan, which basically undoes the scan operation.

Figure 5:
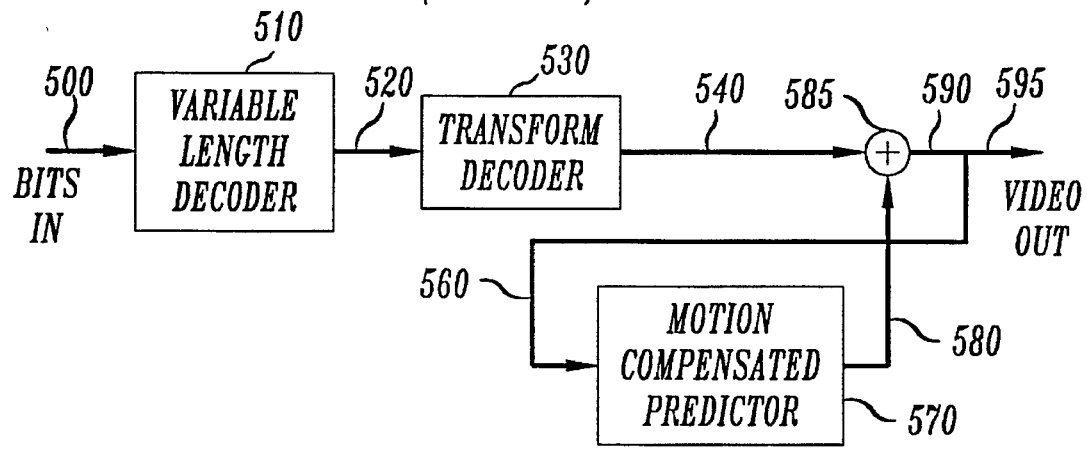
FIG. 5 is a simplified block diagram of an illustrative interframe motion compensated transform decoder.

FIG. 5 is a simplified block diagram of an illustrative generalized interframe decoder. An incoming stream of bits from a transport medium, such as a transmission channel or a storage disk, is input over bus 500 to variable length decoder 510 which demultiplexes and decodes the bit patterns codes representing different overhead (not shown) and the encoded events representing quantized DCT zero coefficient runs and non-zero amplitudes. The latter are output on bus 520 and fed to transform decoder 530. The transform decoder 530 is an exact replica of the transform decoder 140 in the local decoding loop of the generalized interframe encoder of FIG. 1. As will be appreciated by those skilled in the art, in the absence of errors on the transport medium, the input on bus 520 of the transform decoder 530 and the output of transform decoder on bus 540, carry the exact corresponding signals as input on bus 130 of the transform decoder 140 (FIG. 1) and its output on bus 145 (FIG. 1). Next, the decoded blocks of pixels representing approximated prediction error signal on bus 540 are summed in the adder 585 with the prediction signal 580 at the output of motion compensated predictor 570. The output of the adder 585 appears on the bus 590 and represents the decoded video at bus 595. The same output is also fed back to the motion compensated predictor 570 via bus 560 and the prediction generated by 570 is output on bus 580 and forms one input to the adder 585. Those skilled in the art will appreciate that operation of the motion compensated predictor need not be described in detailed herein. As above, it can produce not only the forward prediction, as in the CCITT H.261 standard, but also the forward and the backward predictions, as in MPEG-1 standard. Thus, the operation of motion compensation loop of the local encoder and decoder are practically identical, except that the decoder does not compute motion vectors since they are extracted from the decoded bitstream.

The zigzag scan 300 shown in FIG. 3 is only optimal when scanning blocks of pixels containing relatively flat areas or non-oriented texture. Since many simple video scenes contain a relatively high percentage of low detail areas containing directionally insensitive texture, and only a small percentage of blocks contain edges or directionally aligned structure, the zigzag scan works well overall. However, in many applications such as with normal television, interlaced format video that provides a higher spatio-temporal resolution while striking a compromise between the vertical and the temporal resolution, must be used. In interlaced format video, each frame consists of two fields each of half vertical resolution of a frame but occurring at twice the frame rate. Unlike the simple, also known the progressive, format used in video conferencing, this type of format results in many artificial edges due to interlaced nature of each frame. Thus, the alternative scan in accordance with the invention works better than conventional zigzag scans since it takes into account such characteristics of interlaced video.

Figure 6:
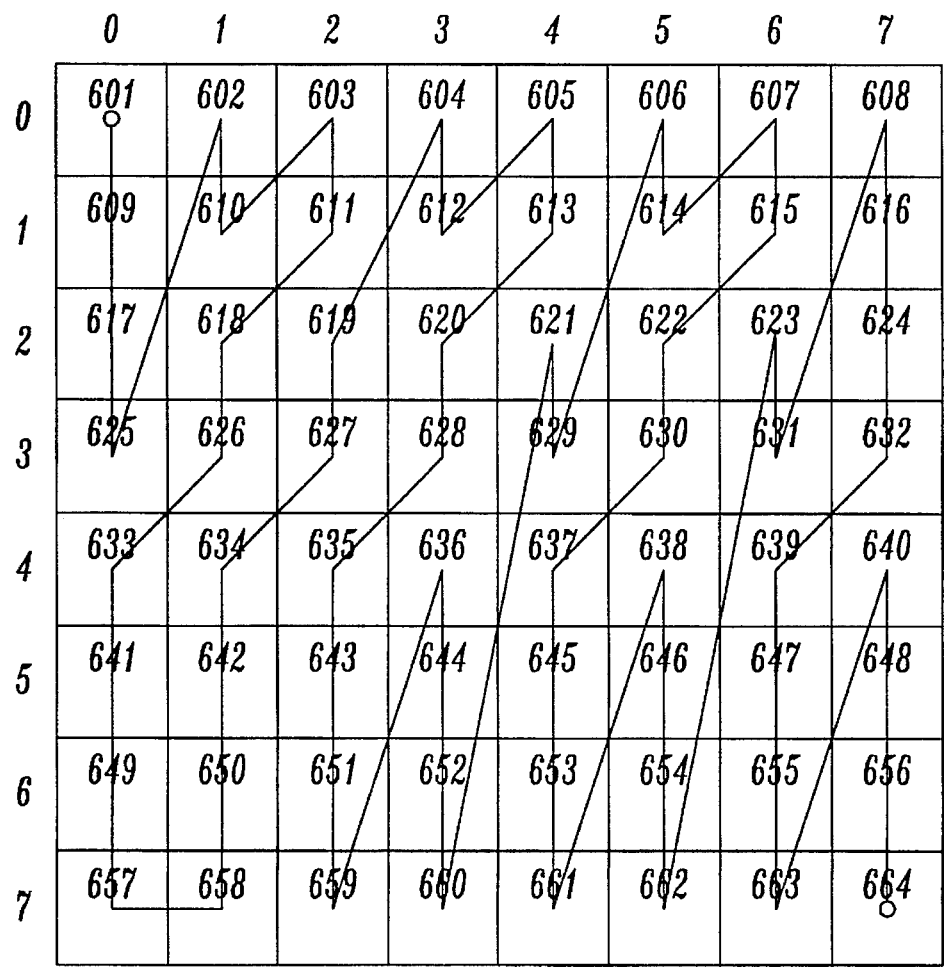
FIG. 6 shows the order in which DCT coefficients are scanned in accordance with the invention.

FIG. 6 shows the order in which the quantized transform coefficients forming a two-dimensional block are scanned to produce a one-dimensional sequence of quantized transform coefficients when performing an alternative to conventional zigzag scans in accordance with the invention. Starting with the DC coefficient located at 601, low frequency coefficients located at 609, 617,625,602, 610, 603, 611, 618, 626, 633, 641, 649, 657, 658, 650, 642, 634, 627, 619, 604 and so on along the alternate scan path, as shown, until the last coefficient located at 664 is scanned.

Figure 7:
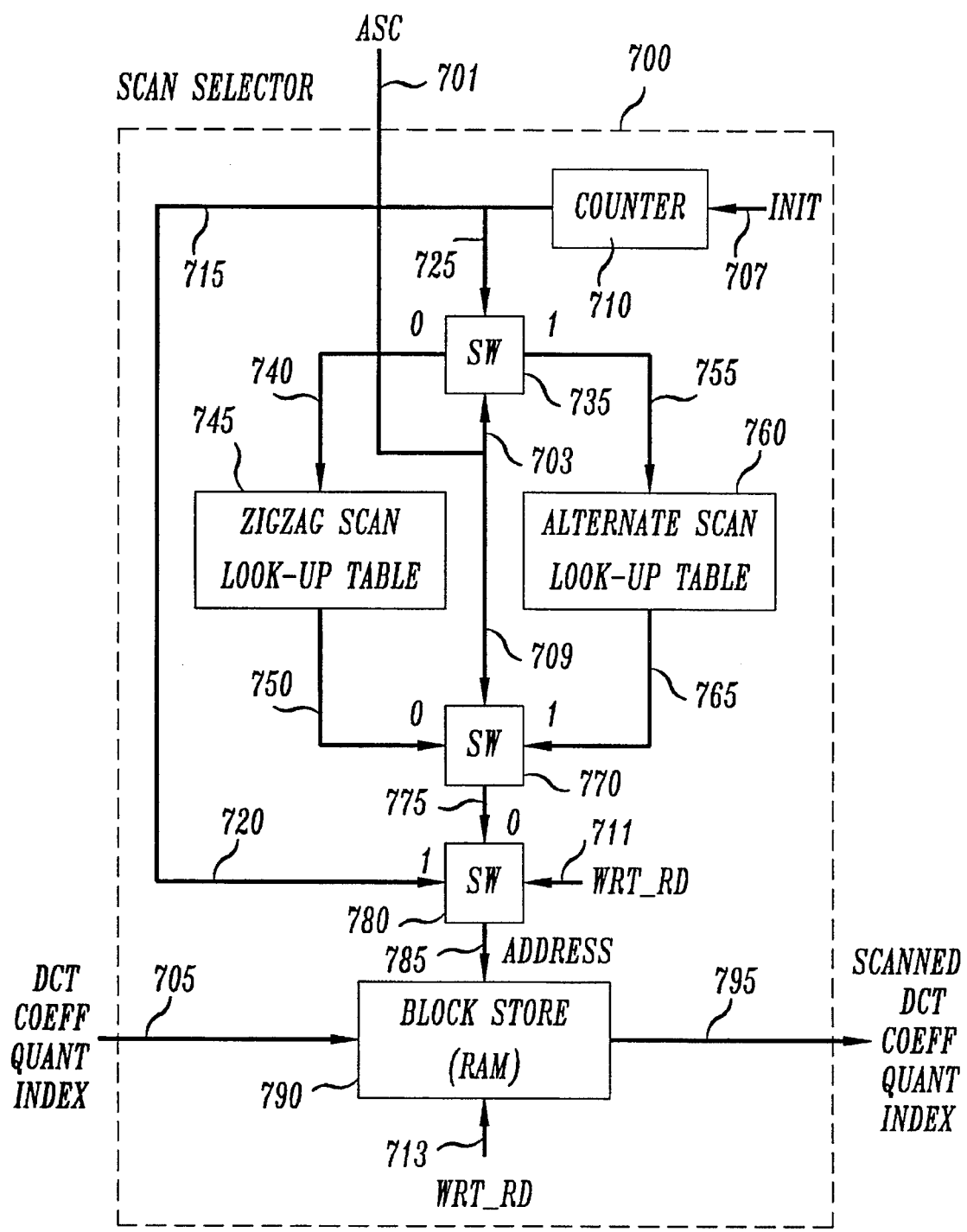
FIG. 7 is a simplified block diagram of a forward scan operation with scan selection, arranged in accordance with the invention.

FIG. 7 is a simplified block diagram of an illustrative example of a scan selector 700 that allows selection between the conventional zigzag scan and the new alternative scan described above, in accordance with the invention. Quantized DCT coefficient blocks corresponding to blocks of pixels enter at bus 705. Counter 710 is initialized by control signal "init" on bus 707, the count on bus 715 at the output of the counter is made available on bus 720 which feeds the switch 780. At this time the "wrt_rd" control signal at switch 780 is set to "1" connecting the bus 720 to bus 785 and the incoming quantized DCT coefficient is stored in block store 790 at address on bus 785. This process is repeated until all coefficients of a block are stored in the block store 790.

Next, depending on the value of the alternate scan control signal "asc" on bus 701, either the zigzag scan lookup table 745 or the alternate scan lookup table 760 is utilized. Counter 710 is initialized by control signal "init" on line 707. The output of the this counter on bus 715 provides a count of the coefficient being scanned. This signal is now available on bus 725 and applied to switch 735. Now, assume that control signal "asc" is set to "1" selecting the alternate scan. Switch 735 connects bus 725 with bus 755. Depending on the coefficient being processed, using look up table 760, a corresponding address along the scan appears on bus 765 through switch 770 to bus 775. Alternatively, if control signal "asc" is set to "0", the conventional zigzag scan is selected. Switch 735 connects bus 725 to bus 740 and corresponding contents of lookup table 745 appear on bus 750 and appear through switch 770 on bus 775. At this time, control signal "wrt_rd" on line 711 is set to "0" and, thus switch 780 connects bus 775 to bus 785. The address on bus 785 is now applied to the block store to retrieve the next coefficient along the one-dimensional scan. This process is repeated until all coefficients in a two-dimensional coefficient block in block store are ordered as a one dimensional sequence of coefficients facilitating the maximization of zero runs of coefficients and non-zero amplitude values along the scan. This process is repeated for every incoming coefficient block on line 705.

Figure 8:
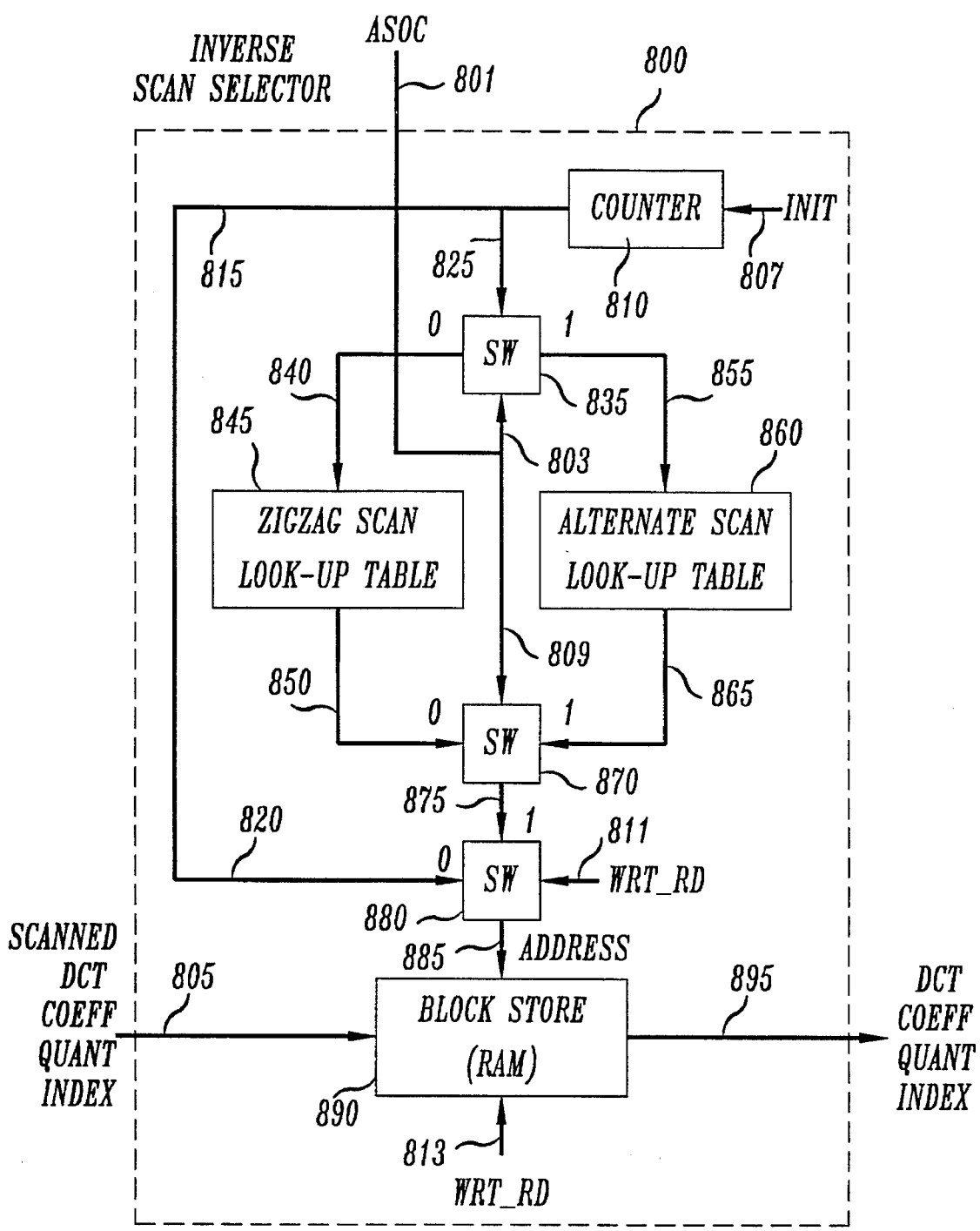
FIG. 8 is a simplified block diagram of an inverse scan operation that uses scan selection at an encoder, arranged in accordance with the invention.

FIG. 8 is a simplified block diagram of an illustrative example of an inverse scan selector that allows selection between the conventional zigzag scan and the alternate scan for the purpose of reversing the scanning operation performed by the scan selector 700. Inverse scan selector 800 is similar in form and operation as scan selector 700, with the exception that some control signals are interpreted differently. Here, an incoming 1-dimensional scanned block of quantized DCT coefficients enters at bus 805, the counter 810 is initialized by the control signal "init" on bus 807 and the count on bus 815 at the output of the counter is made available on bus 820 which feeds the switch 870. At this time the "wrt_rd" control signal at switch 880 is set to "0" connecting the output of bus 820 to bus 885. This process is repeated until all coefficients of a block are stored in bl0ck store 890.

Next, depending on the value of the alternate scan control signal "asc" on bus 801, either the zigzag scan lookup table 845 or the alternate scan lookup table 860 is utilized. Counter 810 is initialized by control signal "init" on line 807. The output of the this counter on bus 815 provides count of the coefficient being scanned. This signal is available on bus 825 and applied to switch 835. Now, assume that control signal "asc" is set to "1" selecting the alternate scan. Switch 835 now connects bus 825 with bus 855. Depending on the coefficient being processed, using look up table 860, a corresponding address along the scan appears on bus 865 and through the switch 870 to bus 875. Alternatively, if control signal "asc" is set to "0", the zigzag scan would be selected. Switch 835 connects bus 825 to bus 840 and corresponding contents of lookup table 845 appear on bus 850, and appear through switch 870 on bus 875. At this time, control signal "wrt_rd" on line 811 is set to "1" and thus, switch 880 connects the bus 875 to bus 885. The address on bus 885 is now applied to the block store to retrieve the next coefficient along the two-dimensional block. This process is repeated until all the coefficients in a one-dimensional sequence of coefficient in block store are ordered as a two-dimensional block of coefficients. This process is repeated for every incoming coefficient sequence on line 805.

As described so far, this illustrative example of the invention could be used, for example, to adapt the choice of scan either on a block, a macroblock, a slice or on a picture basis. However, the overhead necessary to communicate scan selection information to the decoder may not be insignificant compared to the savings if scan selection on a macroblock or block basis is adopted. Furthermore, the encoder complexity may increase in case, a posterior selection of scan based on bit counting on a block, macro block or a slice basis is performed. Also, as stated earlier, one of the primary reasons for bits savings in scan selection is linked to the nature of the video source. For interlaced sources alternative scan outperforms the zigzag scan, and since a video sequence may be composed of interlaced and progressive frames, a picture based scan selection between the zigzag scan an the alternate scan has be chosen as a compromise in the MPEG-2 video standard.

Figure 9:
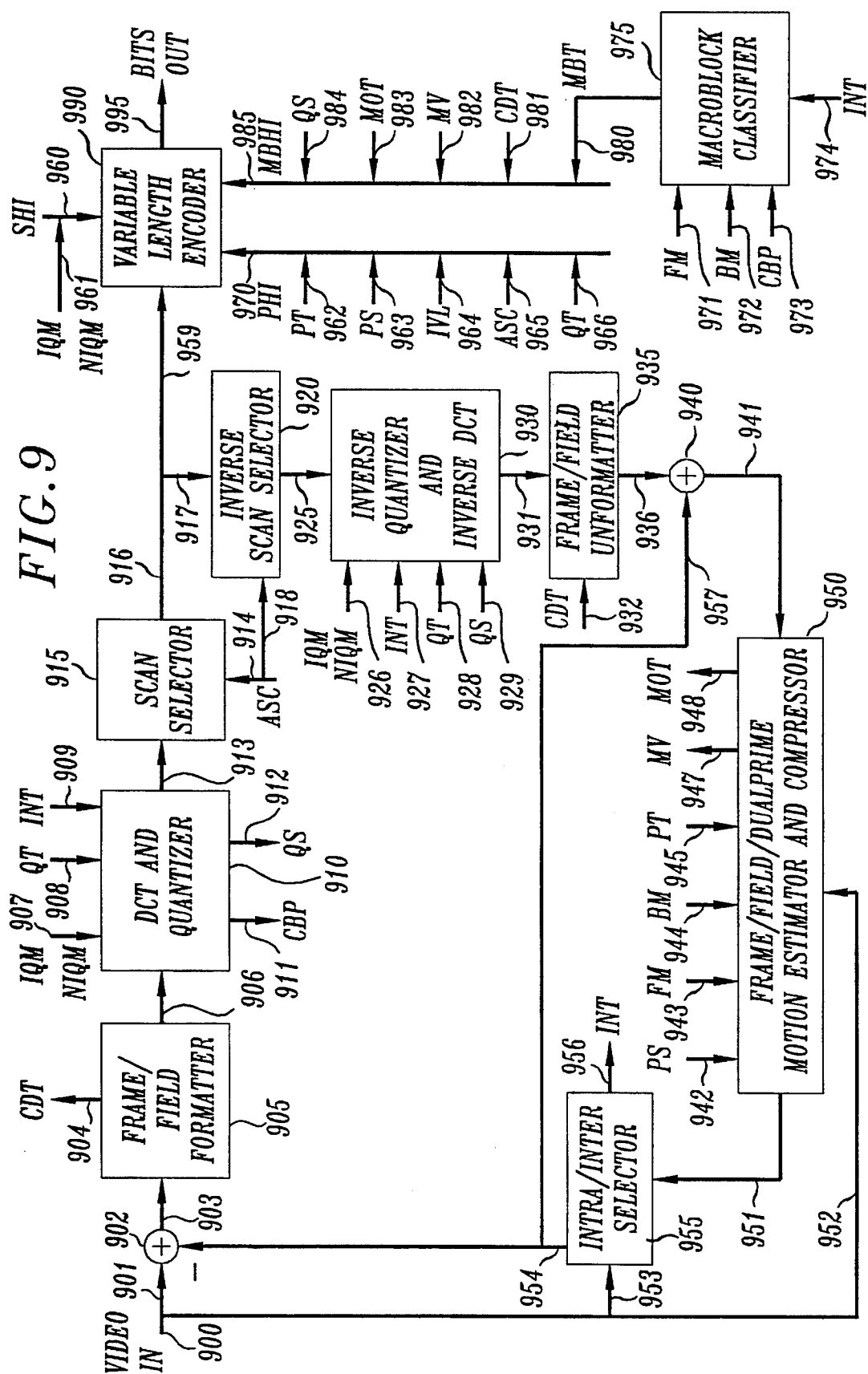
FIG. 9 is a simplified block diagram of an illustrative encoder employing an alternative to conventional zigzag scans and a scan adaptation in accordance with the invention.

Various control/data signals necessary for understanding the operation of some of the elements in FIG. 9 and FIG. 10 are listed below:

pt: picture types allowed are I, P, B as described by MPEG-1.

ps: picture structure (Frame or field).

ivl: vlc selection for a picture.

qt: quantizer type table selected for a picture.

asc: alternate scan selected for a picture.

mv: motion vector/s of a macro block mot motion type (Frame or field or dual prime or submacrobl0ck) for a macro block.

cdt: coding type (Frame or field) for a macroblock.

fro: forward motion direction of a macroblock.

bin: backward motion direction of a macroblock qs: quantizer scale chosen for a macroblock.

cbp: coded block pattern of a macroblock in the intra/inter coding mode for a macroblock.

shi: sequence header information.

phi: picture header information.

mbhi: macroblock header information iqm: intra quantizer matrix for a sequence or part of a sequence niqm: nonintra quantizer matrix for a sequence or part of a sequence FIG. 9 is a simplified block diagram of an encoder employing an alternate scan and a scan adaptation in accordance with the invention. The structure of this encoder is similar in form and operation to the generalized interframe encoder shown in FIG. 1. Although the encoder in FIG. 9 shows several extra operations and a few low level data/control signals, the portions of the circuit not directly related to our invention are not covered in great detail herein as they will be readily apparent to those skilled in the art.

Video enters at bus 900 and is input via bus 901 to subtracter 902 where it is differenced with its prediction signal at bus 958 and the difference appears on bus 903 and enters frame/field formatter 905 where it is retained as frame bl0cks or converted to field blocks on a macroblock basis. The output of the frame/field formatter appears on bus 906 and undergoes DCT transform and quantization in DCT and quantizer 910. For quantization, on a picture basis, a selection from two quantization tables is allowed by the "qt" signal. The intra or inter quantization characteristics are selected by the "in the" signal on a macrobl0ck by macrobl0ck basis and corresponding quantization weighting matrix "iqm" and "niqm" are applied. The output of operations in DCT and quantizer 910 is quantized DCT coefficients on bus 913, and signals representing coded bl0cks in a macro blo0ck 'cbp' on line 911 and quantizer step size "qs" on line 912. Next, quantized DCT coefficients enter scan selector 915, which is similar in form and operation to scan selector 700 (FIG. 7) which allows selection on a picture basis from among the zigzag and the alternate scan. The zigzag scan is selected for progressive frames and the alternate scan for interlaced pictures. The signal controlling the scan selection is "asc" on bus 914 which is discussed above. The scanned quantized coefficients appear on bus 916 at the output of scan selector 915 and are variable length encoded in variable length encoder 990 and multiplexed with encoded data representing various types of overhead. Such overhead information could include, for example, sequence header information "shi" at bus 960, picture header information "phi" at bus 970 and macroblock header information "mbhi" at bus 985 into MPEG-2 bitstream lbrmat for storage or transmission. The sequence header information on bus 960 consists of intra and inter quantization weighting matrices on line 961. The picture header information on bus 970 carries picture type "pt" on line 962, picture structure "ps" on line 963, intra VLC selection "ivl" on line 964, alternate scan selection "asc" on line 965 and quantizer type "qt" on line 966. The macroblock header information on bus 985 carries quantizer step "qs" on line 984, motion type "mot" on line 983, motion vector "mv" on line 982, coding type "cdt" on line 981, and macroblock type on line 980. The macroblock type is obtained from classifier 975 as a result of input control signals, forward motion "fm" on line 97 1, backward motion "bm" on line 972, coded block pattern "cbp" on line 973 and intra/inter decision "in the" on line 974. The bitstream representing coded data and overhead appears on bus 995 for transport or storage.

The local decoding loop at the encoder receives scanned quantized coefficients on bus 917 simultaneously with variable word length encoder 990. These coefficients are inverse scanned in inverse scan selector 920 which requires alternate scan control "asc" to decide which scan to use and output on bus 925 to inverse quantizer and inverse DCT 930. All but one of the control signals input or output from the DCT and quantizer 910 are input control signals to inverse quantizer and inverse DCT. Line 926 carries quantizer matrices, line 927 carries "in the", line 928 carries "qt", and line 929 carries "qs". The output of inverse DCT 930 are reconstructed prediction error blocks on bus 931 and undergo frame/field unformatting in field/frame unformatter 935 to invert the formatting operation of 905.

To the reorganized prediction error blocks on bus 936, motion compensated prediction on bus 957 is summed in adder 940 resulting in local reconstructed output on bus 941, which in turn is used for calculation of motion compensated prediction in 950. There are several choices regarding motion compensation methods in 950 the best one is indicated by motion type "mot" on line 948, the corresponding motion vectors "my" are output on 947. Several control signals such as picture structure on line "942", forward motion "fm" on line 943, backward motion "bm" on line 944 and picture type "pt" on line 945 control the operation of motion estimator and motion compensator 950, whose output is the motion compensated prediction signal on bus 951. This signal is compared with original on bus 953 to decide which would be more efficient to code in intra/inter selector 955 which yields a control signal "in the" on line 956 and prediction signal on bus 954 which appears simultaneously on buses 957 and 958.

The decoder of FIG. 10 performs a subset of operations performed by the local decoder in the encoder shown in FIG. 9. A bitstream at bus 1000 feeds a variable length decoder 1040, where depending on the context, code words representing control data forming sequence header information, macroblock header information, DCT coefficient data are identified and their values are decoded. The sequence header information "shi" is available on bus 1010 and comprises quantizer matrices, iqm and niqm on line 1011. The picture header information "phi" is available on bus 1030 and comprises picture type "pt" on line 1031, picture structure "ps" on line 1032, intra vlc select "ivl" on 1033, alternate scan select "asc" on line 1034 and quantizer type "qt", on line 1035. Also included is macroblock header information on bus 1015 which comprises quantizer step size "qs" on line 10 16, motion type 'mot' on line 1017, motion vectors "mv" on line 1018, coding type "cdt" on line 1019 and macroblock type "mbt" on line 1020. The macroblock type "mbt" on line 1020 is analyzed in 1025 to yield intra/inter decision "in the" on line 1026, coded block pattern "cbp" on bus 1029, forward motion "fm" on line 1028 and backward motion "bm" signal on line 1027. The decoded DCT coefficient data on bus 1036 is input to inverse scan selector 1040 which is controlled by the alternate scan "asc" signal on line 1037 and either performs either an alternative scan or zigzag scan as required. The output of inverse scan 1040 are a normally ordered two-dimensional DCT coefficient blocks and are input to inverse quantizer and inverse DCT 1045 which uses quantization matrices on line 1038, intra/inter signal in the on bus 1042, quantizer type signal "qt" on bus 1043 and quantizer step size "qs" on bus 1044 to perform inverse quantization. The output of inverse quantizer and inverse DCT on bus 1051 is blocks of pixels and to that a motion compensated prediction signal on bus 1075 is summed in adder 1052, the resulting signal on bus 1053 is reconstructed video on bus 1053, 1054 and 1080. The reconstructed video on bus 1054 is used to generate motion compensated prediction in motion compensator 1065 which is controlled by signals 'fm' on line 1055, "bm" on line 1056, "ps" on line 1057, "pt" on line 1058, "mv" on line 1059 and "mot" on line 1060. A difference with respect to motion estimator and compensator 950 at the encoder is that these signals do not need to be generated but instead are extracted from various header information layers in the bitstream. The output of motion compensator 1056 is available on bus 1066, and is either applied as is to bus 1075 via intra/inter adapter 1070, or is zeroed out when "in the" on line 1067 controlling intra/inter adapter is "1" and output on bus 1075.

I claim:

1. A method of encoding a video signal, comprising the steps of:

generating a set of frequency coefficient signals, the set representing the video signal, and corresponding to an N×M matrix, wherein each of the frequency coefficient signals corresponds to a predetermined horizontal coordinate and a predetermined vertical coordinate in the matrix;

scanning a first subset of the frequency coefficient signals within the set in a predetermined first subset scanning order, as represented by the following list of coordinate pairs, each pair representing a horizontal and vertical coordinate in the matrix, to create an ordered set of frequency coefficient signals:

(0, 0), (0, 1), (0, 2), (0, 3), (1, 0), (1, 1), (2, 0), (2, 1), (1, 2), (1,

3), (0, 4), (0, 5), (0, 6), (0, 7) (1, 7);

and generating an encoded video signal, the encoded video signal including the ordered set of frequency coefficient signals.

2. The method of claim 1 wherein the scanning step is performed in response to a frame format associated with the video signal.

3. The method of claim 2 in which the frame format is an interlaced frame format.

4. The method of claim 1 further including a step of scanning a second subset of the frequency coefficient signals within the set in a predetermined second subset scanning order such that the ordered set includes frequency coefficient signals in the second subset, wherein the second subset scanning order is represented by the following list of coordinate pairs:

(1, 6), (1, 5), (1, 4), (2, 3), (2, 2), (3, 0), (3, 1), (4, 0), (4, 1), (3, 2), (3, 3), (2, 4), (2, 5), (2, 6), (2, 7).

5. The method of claim 4 further including a step of scanning a third subset of the frequency coefficient signals within the set in a predetermined third subset scanning order such that the ordered set includes the scanned frequency coefficient signals in the third subset, wherein the third subset scanning order is represented by the following list of coordinate pairs:

(3, 4), (3, 5), (3, 6), (3, 7), (4, 2), (4, 3), (5, 0), (5, 1), (6, 0), (6, 1), (5, 2), (5, 3), (4, 4), (4, 5), (4, 6) (4, 7).

6. The method of claim 5 further including a step of scanning a fourth subset of the frequency coefficient signals within the set in a predetermined fourth subset scanning order such that the ordered set includes the scanned frequency coefficient signals in the fourth subset, wherein the fourth subset scanning order is represented by the following list of coordinate pairs:

(5, 4), (5, 5), (5, 6), (5, 7), (6, 2), (6, 3), (7, 0), (7, 1), (7, 2), (7, 3), (6, 4), (6, 5), (6, 6), (6, 7), (7, 4), (7, 5), (7, 6), (7, 7).

7. A method for encoding a video signal, comprising the steps of:

generating a set of frequency coefficient signals, the set representing the video signal, wherein the set corresponds to an N×M matrix and each of the frequency coefficient signals corresponds to a predetermined horizontal coordinate and a predetermined vertical coordinate in the matrix;

alternatively selecting between a first scanning order and a second scanning order in response to a frame format associated with the video signal;

scanning the set of frequency coefficient signals according to the selected scanning order to cream an ordered set of frequency coefficient signals; and generating an encoded video signal, the encoded video signal including the ordered set of frequency coefficient signals.

8. The method of claim 7 in which the first scanning order comprises a zigzag scanning order.

9. The method of claim 7 in which the second scanning order includes a first subset scanning order represented by the following list of coordinate pairs, each pair representing a horizontal and vertical coordinate in the matrix:

(0, 0), (0, 1), (0, 2), (0, 3), (1, 0), (1, 1), (2, 0), (2, 1), (1, 2), (1, 3), (0, 4), (0, 5), (0, 6), (0, 7) (1, 7).

10. The method of claim 9 in which the second scanning order further includes a second subset scanning order matrix such that the ordered set includes frequency coefficient signals in a second subset, the second subset scanning order represented by the following list of coordinate pairs, each pair representing a horizontal and vertical coordinate in the matrix:

(1, 6), (1, 5), (1, 4), (2, 3), (2, 2), (3, 0), (3, 1), (4, 0), (4, 1), (3, 2), (3, 3), (2, 4), (2, 5), (2, 6), (2, 7).

11. The method of claim 10 in which the second scanning order further includes a third subset scanning order matrix such that the ordered set includes frequency coefficient signals in a third subset, the third subset scanning order represented by the following list of coordinate pairs, each pair representing a horizontal and vertical coordinate in the matrix:

(3, 4), (3, 5), (3, 6), (3, 7), (4, 2), (4, 3), (5, 0), (5, 1), (6, 0), (6, 1), (5, 2), (5, 3), (4, 4), (4, 5), (4, 6) (4, 7).

12. The method of claim 11 in which the second scanning order further includes a fourth subset scanning order matrix such that the ordered set includes frequency coefficient signals in the fourth subset, the fourth subset scanning order represented by the following list of coordinate pairs, each pair representing a horizontal and vertical coordinate in the matrix:

(5, 4), (5, 5), (5, 6), (5, 7), (6, 2), (6, 3), (7, 0), (7, 1), (7, 2), (7, 3), (6, 4), (6, 5), (6, 6), (6, 7), (7, 4), (7, 5), (7, 6), (7, 7).

13. An apparatus for encoding a video signal, comprising:

a discrete cosine transform coefficient generator for generating a set of frequency coefficient signals, the set representing the video signal and corresponding to an N×M matrix, wherein each of the frequency coefficient signals corresponds to a predetermined horizontal coordinate and a predetermined vertical coordinate in the matrix;

a scanner for scanning a first subset of the frequency coefficient signals within the set in a predetermined first subset scanning order, as represented by the following list of coordinate pairs, each pair representing a horizontal and vertical coordinate in the matrix, to create an ordered set of frequency coefficient signals:

(0, 0), (0, 1), (0, 2), (0, 3), (1, 0), (1, 1), (2, 0), (2, 1), (1, 2), (1, 3), (0, 4), (0, 5), (0, 6), (0, 7) (1, 7);

and a means for generating an encoded video signal, the encoded video signal including the ordered set of frequency coefficient signals.

14. The apparatus of claim 13 in which the scanner performs the scanning in response to a frame format associated with the video signal.

15. The apparatus of claim 14 in which the frame format is an interlaced frame format.

16. The apparatus of claim 13 in which the scanner further including a means for scanning a second subset of the frequency coefficient signals within the set in a predetermined second subset scanning order such that the ordered set includes frequency coefficient signals in the second subset, wherein the second subset scanning order is represented by the following list of coordinate pairs:

(1, 6), (1, 5), (1, 4), (2, 3), (2, 2), (3, 0), (3, 1), (4, 0), (4, 1), (3,

2), (3, 3), (2, 4), (2, 5), (2, 6), (2, 7).

17. The apparatus of claim 16 in which the scanner further includes a means for scanning a third subset of the frequency coefficient signals within the set in a predetermined third subset scanning order such that the ordered set includes the scanned frequency coefficient signals in the third subset, wherein the third subset scanning order is represented by the following list of coordinate pairs:

(3, 4), (3, 5), (3, 6), (3, 7), (4, 2), (4, 3), (5, 0), (5, 1), (6, 0), (6, 1), (5, 2), (5, 3), (4, 4), (4, 5), (4, 6) (4, 7).

18. The apparatus of claim 17 in which the scanner further includes a means for scanning a fourth subset of the frequency coefficient signals within the set in a predetermined fourth subset scanning order such that the ordered set includes the scanned frequency coefficient signals in the fourth subset, wherein the fourth subset scanning order is represented by the following list of coordinate pairs:

(5, 4), (5, 5), (5, 6), (5, 7), (6, 2), (6, 3), (7, 0), (7, 1), (7, 2), (7, 3), (6, 4), (6, 5), (6, 6), (6, 7), (7, 4), (7, 5), (7, 6), (7, 7).

19. An apparatus for encoding a video signal, comprising:

a discrete cosine transform generator for generating a set of frequency coefficient signals, the set representing the video signal and corresponding to an N×M matrix, wherein each of the frequency coefficient signals corresponds to a predetermined horizontal coordinate and a predetermined vertical coordinate in the matrix;

a scan selector for alternatively selecting between a first scanning order and a second scanning order in response to a frame format associated with the video signal;

a scanner for scanning the set of frequency coefficient signals according to the selected scanning order to create an ordered set of frequency coefficient signals; and a means for generating an encoded video signal, the encoded video signal including the ordered set of frequency coefficient signals.

* * * * *

UNITED STATES PATENT AND TRADEMARK OFFICE
CERTIFICATE OF CORRECTION

| | | |
|---|---|---|
| PATENT NO. | : 5,500,678 | Page 1 of 1 |
| APPLICATION NO. | : 08/215532 | |
| DATED | : March 19, 1996 | |
| INVENTOR(S) | : Atul Puri | |

It is certified that error appears in the above-identified patent and that said Letters Patent is hereby corrected as shown below:

Column 9, line 55, "cream" should read --create--.

Signed and Sealed this

Twenty-ninth Day of May, 2007

JON W. DUDAS
*Director of the United States Patent and Trademark Office*